United States Patent
Ogawa et al.

(10) Patent No.: US 11,311,947 B2
(45) Date of Patent: Apr. 26, 2022

(54) ROTARY TOOL

(71) Applicant: KYOCERA Corporation, Kyoto (JP)

(72) Inventors: Hiroshi Ogawa, Omihachiman (JP); Takaya Watanabe, Higashiomi (JP)

(73) Assignee: KYOCERA CORPORATION, Kyoto (JP)

(*) Notice: Subject to any disclaimer, the term of this patent is extended or adjusted under 35 U.S.C. 154(b) by 57 days.

(21) Appl. No.: 16/617,884

(22) PCT Filed: Jun. 1, 2018

(86) PCT No.: PCT/JP2018/021251
§ 371 (c)(1),
(2) Date: Nov. 27, 2019

(87) PCT Pub. No.: WO2018/221737
PCT Pub. Date: Dec. 6, 2018

(65) Prior Publication Data
US 2020/0114434 A1 Apr. 16, 2020

(30) Foreign Application Priority Data
Jun. 2, 2017 (JP) .............................. JP2017-109889

(51) Int. Cl.
*B23B 51/02* (2006.01)

(52) U.S. Cl.
CPC ........ *B23B 51/02* (2013.01); *B23B 2251/043* (2013.01); *B23B 2251/40* (2013.01)

(58) Field of Classification Search
CPC ........ B23B 2251/245; B23B 2251/242; B23B 2251/446; B23B 2251/44; B23B 2251/54; B23B 2251/043; B23B 51/02
See application file for complete search history.

(56) References Cited

U.S. PATENT DOCUMENTS

2013/0136552 A1 * 5/2013 Ono ........................ B23B 35/00
408/1 R

FOREIGN PATENT DOCUMENTS

| CH | 665979 A5 * | 6/1988 | ............. B23B 51/02 |
| CN | 105965071 A | 9/2016 | |
| DE | 102010012963 A1 * | 9/2011 | ............. B23B 51/02 |

(Continued)

OTHER PUBLICATIONS

English machine translation of CH 665979, Jun. 1988 (Year: 1988).*
English translation of DE 102010012963 (Year: 2011).*

*Primary Examiner* — Alan Snyder
(74) *Attorney, Agent, or Firm* — Volpe Koenig

(57) ABSTRACT

A rotary tool according to a non-limiting aspect includes a body having a rotation axis and extending from a first end to a second end. The body including: a first part including the first end; a second part located closer to a second end than the first part and having a larger outside diameter than the first part; a cutting edge located at a side of the first end; a ridge portion located in the first part and the second part, connected to the cutting edge and helically extending from the cutting edge toward the second end; and a flute located along the ridge portion. The flute includes: a first flute located at the first part and having a first helix angle; and a second flute located at the second part and having a second helix angle. The second helix angle is smaller than the first helix angle.

8 Claims, 14 Drawing Sheets

(56) References Cited

FOREIGN PATENT DOCUMENTS

| JP | 63-086911 U1 | 6/1988 | | |
|----|----|----|----|----|
| JP | 2003-136319 A | 5/2003 | | |
| JP | 2010-131736 A | 6/2010 | | |
| JP | 2014-054680 A | 3/2014 | | |
| WO | WO-2008133295 A1 | * 11/2008 | ............ | B23D 77/02 |
| WO | 2016/189937 A1 | 12/2016 | | |

* cited by examiner

ROTARY TOOL

CROSS-REFERENCE TO RELATED APPLICATIONS

This application is a national stage entry according to 35 U.S.C. 371 of PCT Application No. PCT/JP2018/021251 filed on Jun. 1, 2018, which claims priority to Japanese Application No. 2017-109889 filed on Jun. 2, 2017, which are entirely incorporated herein by reference.

TECHNICAL FIELD

The present aspect relates to a rotary tool.

BACKGROUND ART

As drills including a small diameter portion on a tip side of a drill body and a large diameter portion on a rear end side of the drill body, stepped drills described in, for example, Patent Documents 1 and 2 are known. Stepped drills allow fabrication such as boring, stepped boring, and chamfering and enables efficient machining. In a drill described in JP 2010-131736 A (Patent Document 1), the helix angle of the small diameter portion and the helix angle of the large diameter portion are the same. Additionally, in a drill described in JP 2014-054680 A (Patent Document 2), the helix angle of the small diameter portion is smaller than the helix angle of the large diameter portion.

In the stepped drill described in Patent Document 1, the helix angle of the small diameter portion and the helix angle of the large diameter portion are the same. In a case where the helix angles of both the small and large diameter portions are increased in order to reduce cutting resistance of the small diameter portion, deflection of the large diameter portion may be more significant. Additionally, in a case where the helix angles of both the small and large diameter portion are reduced in order to reduce deflection of the large diameter portion, the cutting resistance of the small diameter portion is increased, possibly leading to more significant run-out.

In the stepped drill described in Patent Document 2, the helix angle of the small diameter portion is smaller than the helix angle of the large diameter portion. Thus, in a case where the helix angle of the small diameter portion is increased in order to reduce the cutting resistance of the small diameter portion, since the helix angle of the large diameter portion is larger than the helix angle of the small diameter portion, deflection of the large diameter portion may be more significant. Additionally, in a case where the helix angle of the large diameter portion is reduced in order to reduce deflection of the large diameter portion, since the helix angle of the small diameter portion is smaller than the helix angle of the large diameter portion, the small diameter portion has increased cutting resistance, possibly leading to more significant run-out.

SUMMARY OF INVENTION

A rotary tool according to a non-limiting aspect includes a body having a rotation axis and a rod like shape extending from a first end to a second end. The body includes: a first part including the first end; a second part located closer to the second end than the first part and having a larger outside diameter than the first part; a cutting edge located at a side of the first end; a ridge portion located in the first part and the second part, connected to the cutting edge and helically extending from the cutting edge toward the second end; and a flute located along the cutting edge and the ridge portion. The flute includes: a first flute located at the first part and having a first helix angle; and a second flute located at the second part and having a second helix angle. The second helix angle is smaller than the first helix angle.

DESCRIPTION OF EMBODIMENTS

Now, with reference to the drawings, detailed description will be given of a rotary tool according to a non-limiting embodiments of the present disclosure. However, for convenience of description, each of the drawings referenced below is simplified to illustrate only main members among constituent members of the embodiments. Accordingly, the rotary tool may be provided with any constituent member that is not illustrated in each of the drawings referenced in this specification. Further, the dimensions of the members in each of the drawings do not faithfully represent the actual dimensions of the constituent members and the dimension ratios of each of the members.

FIG. 1 to FIG. 10 may illustrate a two-step drill as an example of a rotary tool 1. Note that the rotary tool of the present disclosure is not limited to two-step drills. The rotary tool may be, for example, a multi-step boring drill or may be an end mill or reamer.

Figure 1:
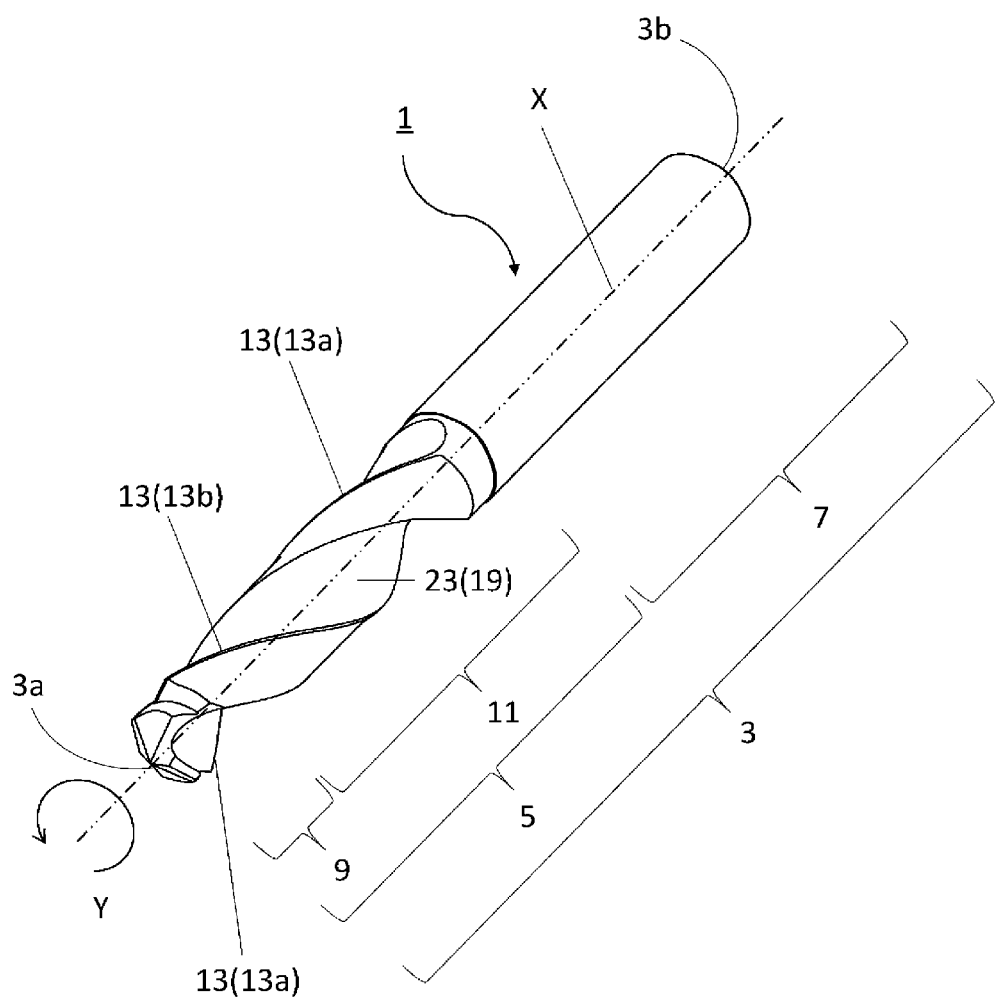
FIG. 1 is a perspective view illustrating a rotary tool of a non-limiting aspect of embodiments.

As illustrated in FIG. 1, the rotary tool 1 according to the embodiments of the present disclosure may include a rod-shaped body 3 extending from a first end 3a to a second end 3b. The rod-shaped body 3 may rotate around a rotation axis X in a direction of an arrow Y when a workpiece is machined to manufacture a machined product.

Figure 3:
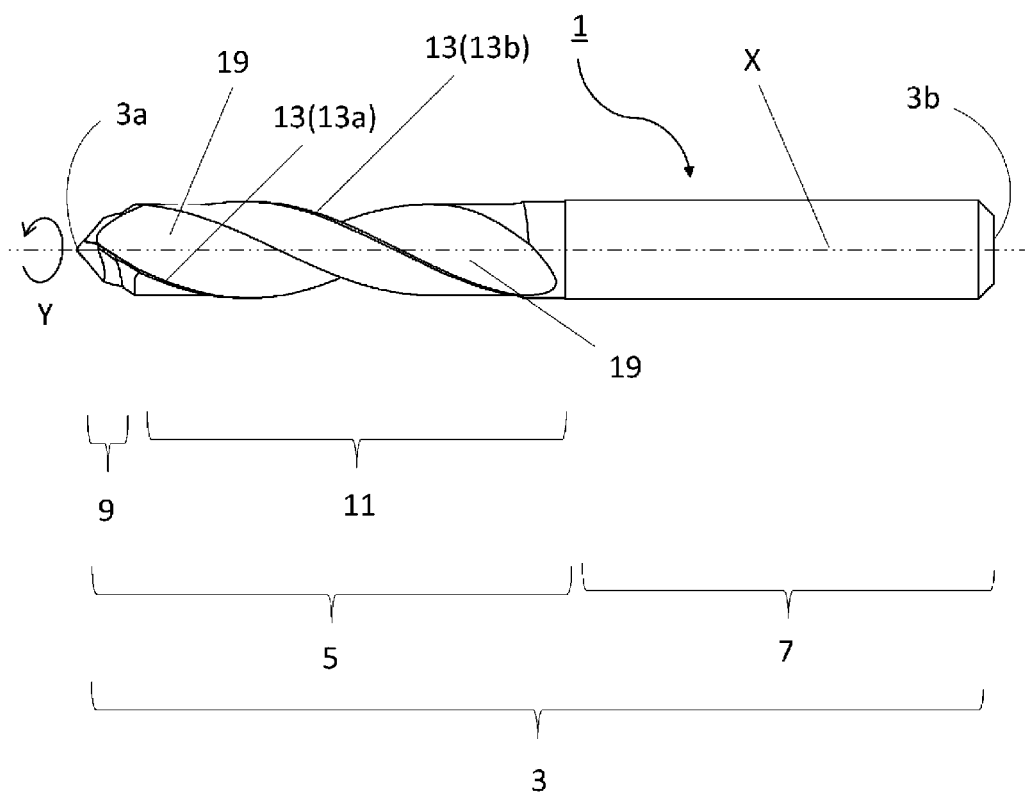
FIG. 3 is a side view as viewed from an A direction illustrated in FIG. 2.
Figure 4:
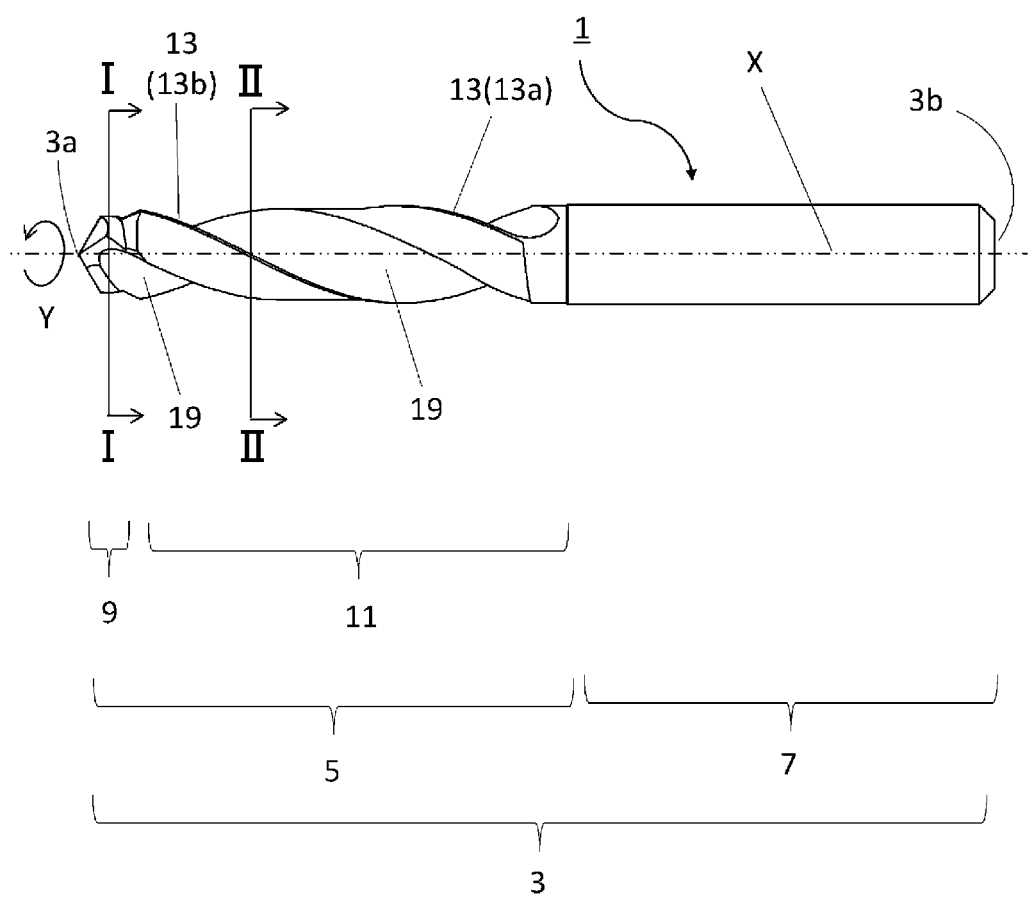
FIG. 4 is a side view as viewed from a B direction illustrated in FIG. 2.

In an example illustrated in FIG. 3 and FIG. 4, a left end of the body 3 may correspond to the first end 3a, and a right end of the body 3 may correspond to the second end 3b. Hereinafter, the first end 3a may be referred to as the tip 3a, and the second end 3b may be referred to as the rear end 3b to reflect the usage condition of the rotating tool 1 during machining.

The body 3 may include a cutting section 5 and a shank section 7. The shank section 7 may be a site gripped by a rotating spindle of a machine tool and designed in accordance with the shape of the spindle in the machine tool. Examples of the shape of the shank section 7 may include a straight shank, a long shank, a long neck, a tapered shank, and the like.

The cutting section 5 may be located on the tip 3a side with respect to the shank section 7. The cutting section 5 may include a site that comes into contact with the workpiece, and the site may play a key role in machining the workpiece.

As illustrated in FIG. 1, FIG. 3, and FIG. 4, the body 3 may include a first part 9 that is a portion located to include the tip 3a; and a second part 11 located closer to the rear end 3b than the first part 9 and has a larger outside diameter than the first part 9. Specifically, in the cutting section 5 of the body 3, the second part 11 may be a portion located on the rear end 3b side, and the first part 9 may be located closer to the tip 3a than the second part 11 and may have a smaller outside diameter than the second part 11.

The cutting section 5 in an example illustrated in FIG. 3 may include a first region located on the rear end 3b side and having an approximately constant outside diameter, a second region located adjacent to the first region on the tip 3a side and having an outside diameter decreasing toward the tip 3a, a third region located adjacent to the second region on the tip 3a side and having an approximately constant outside diameter, and a fourth region located extending from the third region to the tip 3a and having an outside diameter decreasing toward the tip 3a.

In this regard, the first part 9 may be considered to correspond to a region including the third region and the fourth region. Additionally, the second part 11 may be considered to correspond to a region including the first region and the second region.

The body 3 may include a ridge portion 13 located in the first part 9 and the second part 11 and helically extending from the tip 3a side toward the rear end 3b side. In the embodiments, the body 3 may include two ridge portions 13. In the example illustrated in FIG. 1 and the like, the two ridge portion 13 may be referred to as a ridge portion 13a and a ridge portion 13b. Note that the number of ridge portions 13 may be one or three or more.

The above "helically extending" may mean that the ridge portion 13 extends substantially spirally from the tip 3a side toward the rear end 3b side. Thus, the ridge portion 13 may include a non-helical portion. For example, a part on the tip 3a side of the first part 9 of the ridge portion 13 may extend along the rotation axis X and need not be helically formed.

A cutting edge may be located in at least a part of the ridge portion 13. That is, a part or all of the ridge portion 13 may form a cutting edge. The cutting edge may be located in the non-helical part of the ridge portion 13. In an example illustrated in FIG. 2, two first cutting edges 15 may be located in the non-helical part of the ridge portion 13. In an example illustrated in FIG. 2 and the like, the two first cutting edges 15 may be referred to as a first cutting edge 15a and a first cutting edge 15b. The first cutting edge 15a may include a part of the ridge portion 13a, and the first cutting edge 15b may include part of the ridge portion 13b.

The ridge portion 13 may further include a second cutting edge 17. For example, in an example illustrated in FIG. 5 to FIG. 7, the ridge portion 13 may include the second cutting edge 17 located in the second part 11 on the tip 3a side. In an example illustrated in FIG. 6, two second cutting edges 17 may be referred to as a second cutting edge 17a and a second cutting edge 17b. The second cutting edge 17a may include a part of the ridge portion 13a, and the second cutting edge 17b may include a part of the ridge portion 13b.

Figure 2:
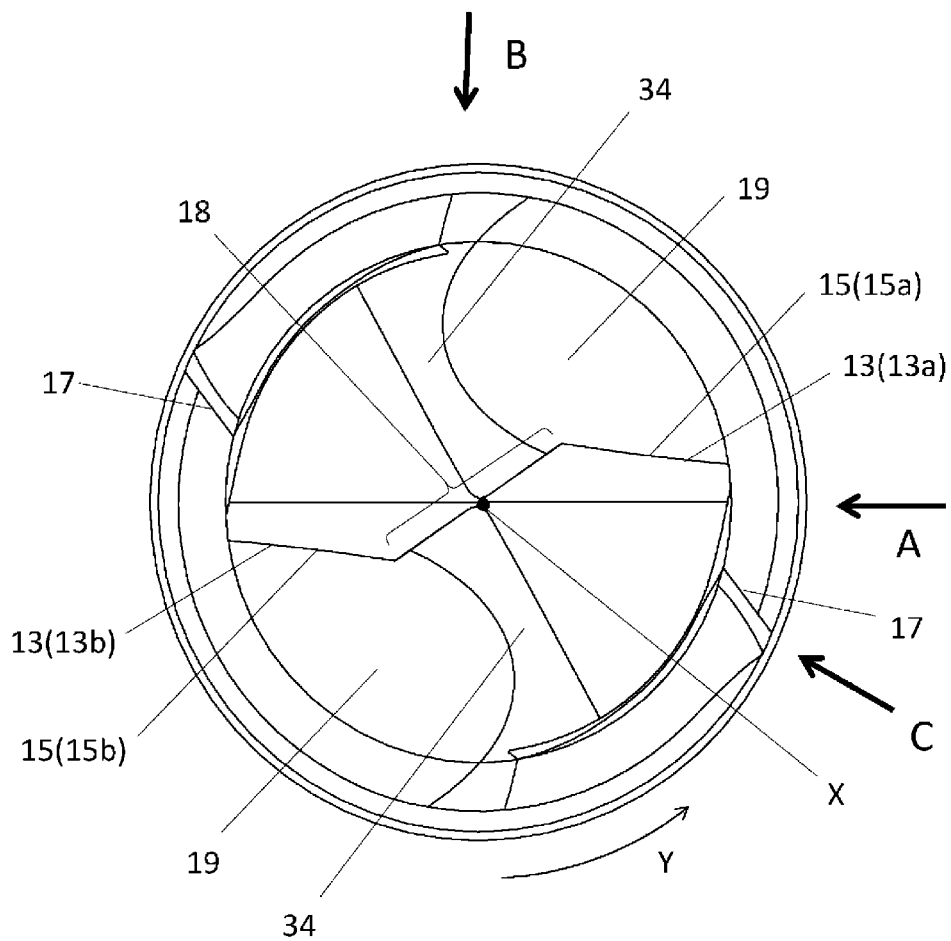
FIG. 2 is a front view of the rotary tool illustrated in FIG. 1.

Additionally, as illustrated in the example illustrated in FIG. 2, the body 3 may include a connecting edge 18 that connects the first cutting edge 15a and the first cutting edge 15b. The connecting edge 18 may be located to include the tip 3a. In the example illustrated in FIG. 2, the connecting edge 18 may be located to include the rotation axis X. During machining, the connecting edge 18 may initially cut into the workpiece. Specifically, the connecting edge 18 may include a thinning edge and a chisel edge located to include the rotation axis X.

The thinning edge may be connected to the first cutting edge 15 and also to the chisel edge. The chisel edge, the thinning edge, and the first cutting edge 15 may be arranged in this order from the rotation axis X toward an outer peripheral side.

Additionally, the body 3 may include a flute 19 located along the ridge portion 13. Note that in a case where the body 3 includes the flutes 19, the above-described configuration may also be described as follows: at least a part of the ridge portion 13 is located on a ridge line where the flute 19 meets an outer peripheral surface of the body 3 adjacent to the flute 19 on a rear side in rotating direction Y.

The flute 19 may include a first flute 21 in a portion corresponding to the first part 9 and a second flute 23 in a portion corresponding to the second part 11. Note that the "portion corresponding to the first part 9" may refer to a portion of the flute 19 located in the first part 9. Similarly, the "portion corresponding to the second part 11" may refer to a portion of the flute 19 located in the second part 11.

As the example illustrated in FIG. 2, the body 3 may include two ridge portions 13. In this case, the body 3 may include two flutes 19 and may include two first flutes 21 constituting the flute 19 and two second flutes 23 also constituting the flute 19.

The first flute 21 may be used to discharge, to the outside, chips generated by the first cutting edge 15. The second flute 23 may be used to discharge, to the outside, chips generated by the first cutting edge 15 and the second cutting edge 17.

Since the ridge portion 13 helically extends as described above, the first and second flutes 21 and 23 located along the ridge portion 13 may also helically extend from the tip 3a side toward the rear end 3b. Here, given that the first flute 21 has a first helix angle $\theta 1$ and the second flute 23 has a second helix angle $\theta 2$, the second helix angle $\theta 2$ may be smaller than the first helix angle $\theta 1$. The first helix angle $\theta 1$ and the second helix angle $\theta 2$ may be in the relationship described above, and thus the rotary tool 1 of the embodiments may be subjected to little deflection and run-out.

Since the first helix angle $\theta 1$ is larger than the second helix angle $\theta 2$, the first cutting edge 15 including a part of the ridge portion 13 located along the first flute 21 may offer reduced cutting resistance. Thus, deflection of the rotary tool 1 during machining may be kept less significant. Additionally, since the second helix angle $\theta 2$ is smaller than the first helix angle θ1, the second part 11 may have an increased strength. Thus, deflection of the rotary tool 1 during machining may be less significant.

It may be sufficient that the second helix angle θ2 is smaller than the first helix angle θ1, and the first helix angle θ1 and the second helix angle θ2 are not limited to particular values. For example, the first helix angle θ1 may be approximately 10 to 45°, and the second helix angle θ2 may be approximately 5 to 40°.

In a case where the first helix angle θ1 is approximately 25 to 40°, the first cutting edge 15 may offer further reduced cutting resistance. Additionally, in a case where the second helix angle θ2 is approximately 20 to 35°, the second part 11 may have a further increased strength.

In a case where a difference (θ1−θ2) between the first helix angle θ1 and the second helix angle θ2 is 3° or larger, the first cutting edge 15 may offer reduced cutting resistance, and the second part 11 may have an increased strength. Additionally, in a case where the difference (θ1−θ2) between the first helix angle θ1 and the second helix angle θ2 is 10° or smaller, changes in a feed direction of chips flowing from the first flutes 21 to the second flutes 23 may be insignificant. Thus, chip clogging in the vicinity of a boundary between the first flutes 21 and the second flutes 23 may be less likely to occur.

Figure 6:
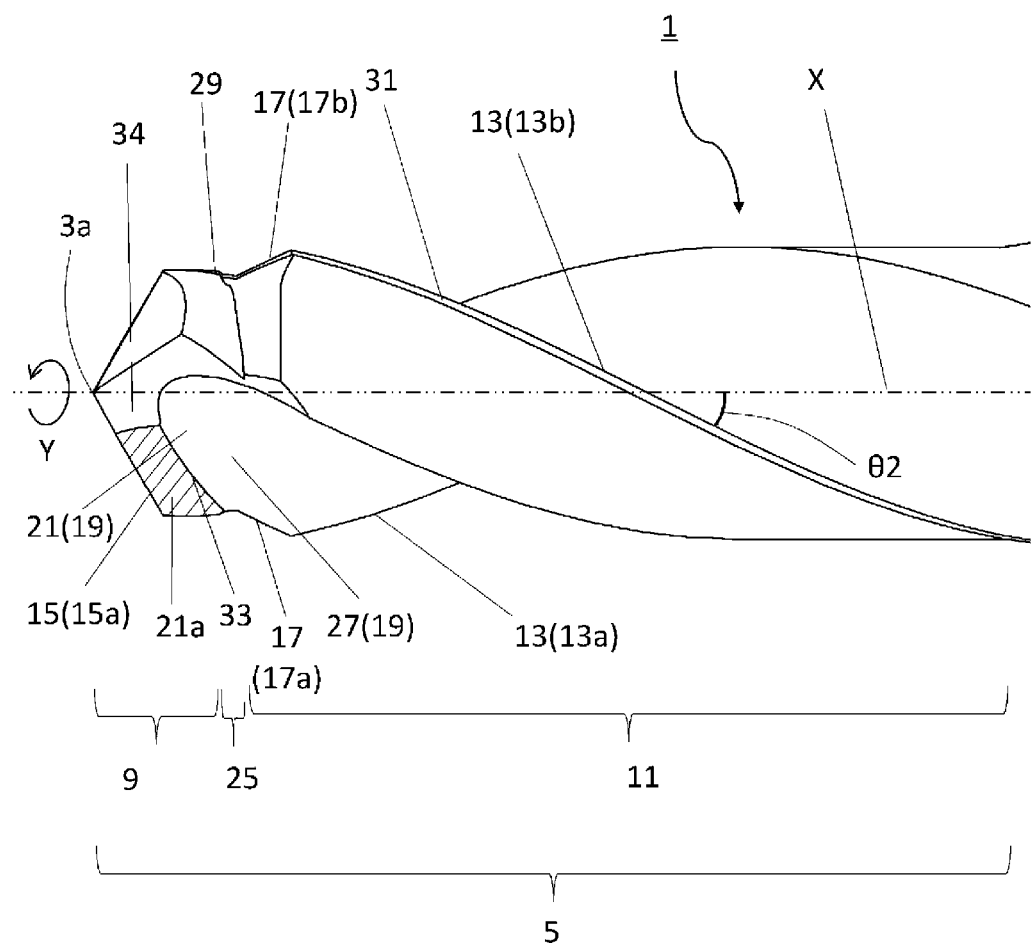
FIG. 6 is an enlarged view of the region including the first end in FIG. 4.

As in an example illustrated in FIG. 6, the helix angle θ2 may be evaluated based on an angle between the second flute 23 and the rotation axis X when the body 3 is viewed from the side. Additionally, the second helix angle θ2 may be evaluated based on an angle between the ridge portion 13 and the rotation axis X in the second part 11.

Figure 5:
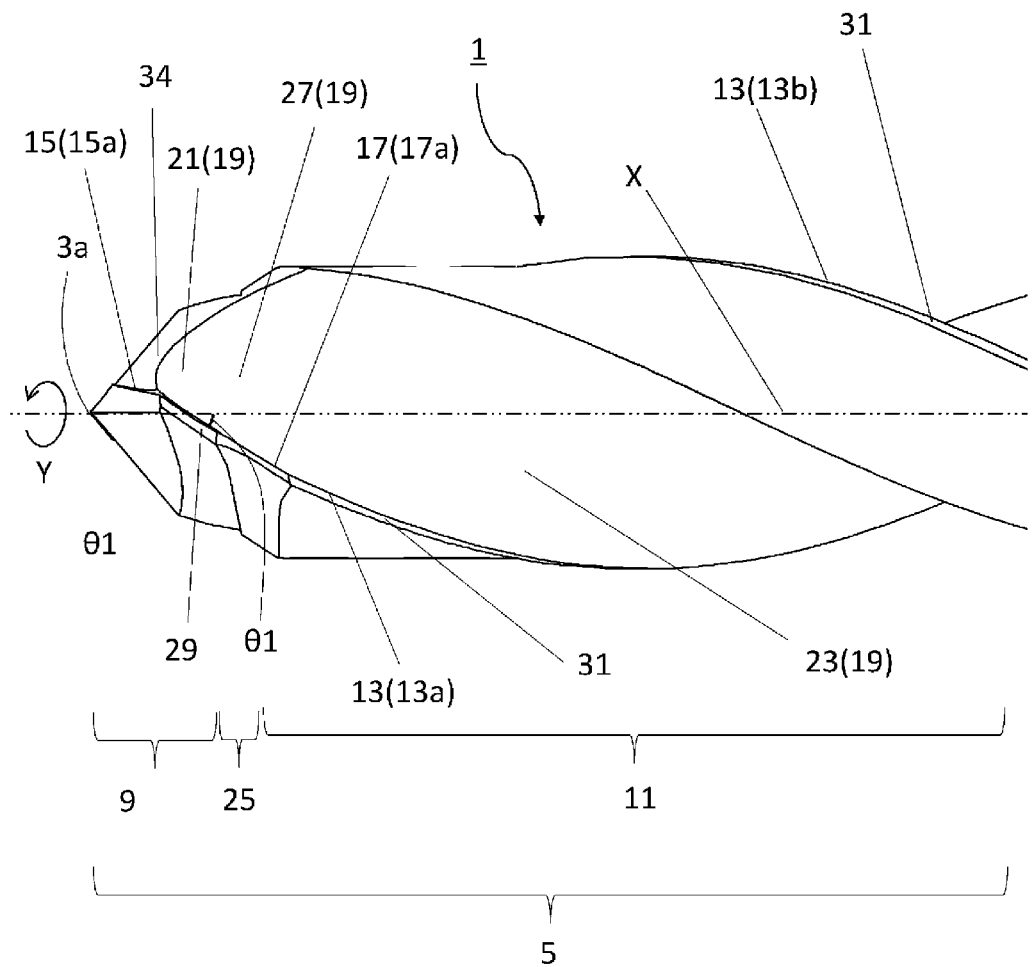
FIG. 5 is an enlarged view of a region including a first end in FIG. 3.

As in an example illustrated in FIG. 5, the first helix angle θ1 may be evaluated based on an angle between the first flute 21 and the rotation axis X when the body 3 is viewed from the side. Additionally, the first helix angle θ1 may be evaluated based on an angle between the ridge portion 13 and the rotation axis X in the first part 9.

Additionally, the body 3 may further include a third part 25 located between the first part 9 and the second part 11 and having a smaller outside diameter than the first part 9. In this case, the flute 19 may include a third flute 27 in a portion corresponding to the third part 25. Note that the "portion corresponding to the third part 25" may refer to a portion of the flute 19 located in the third part 25.

Figure 7:
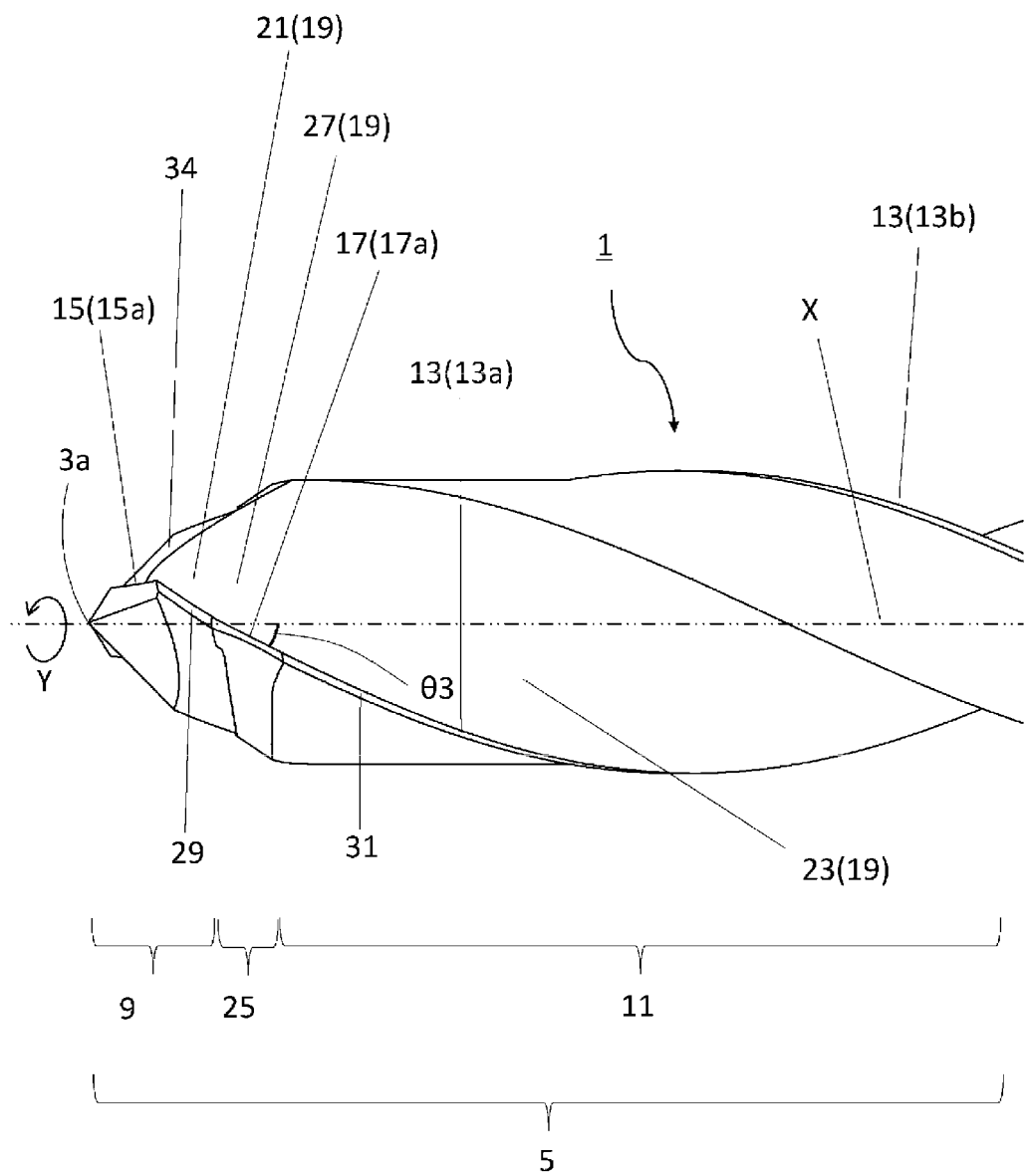
FIG. 7 is an enlarged side view as viewed from a C direction illustrated in FIG. 2.
Figure 8:
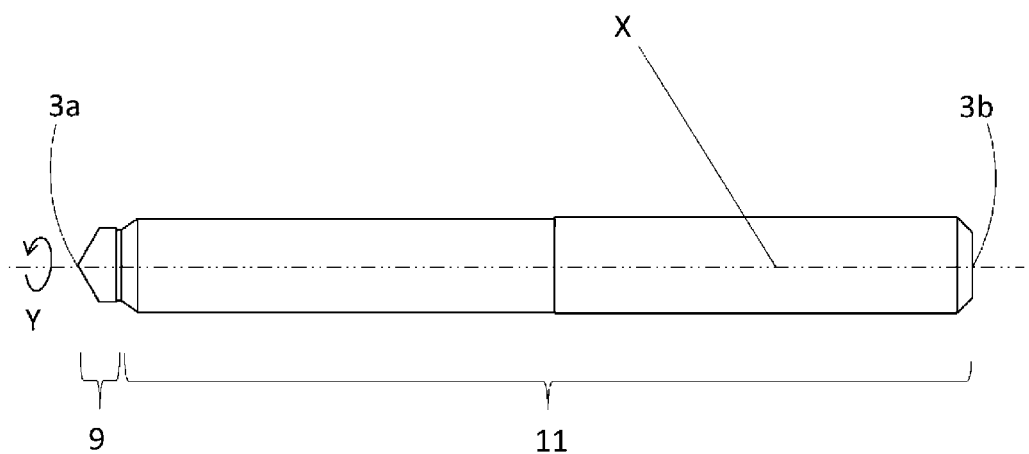
FIG. 8 is a schematic view of a locus of rotation of a composition illustrated in FIG. 3.
Figure 9:
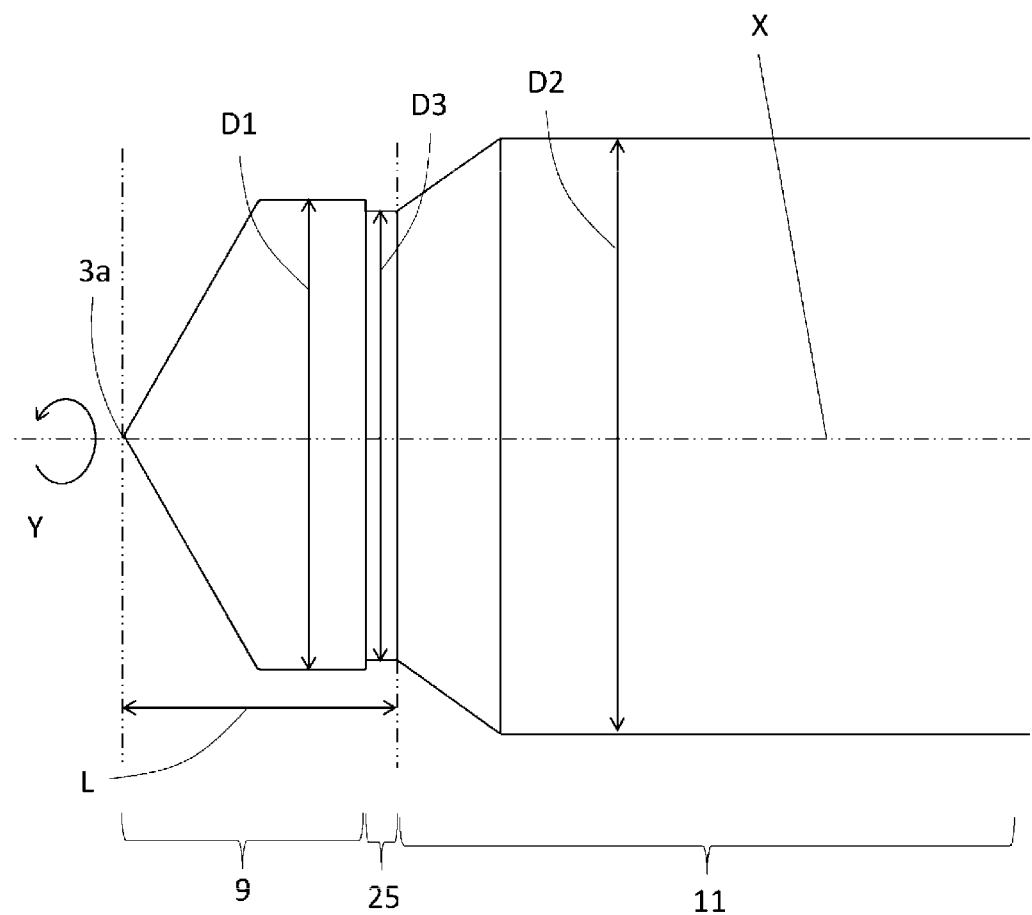
FIG. 9 is an enlarged view of a region including the first end in FIG. 8.
Figure 10:
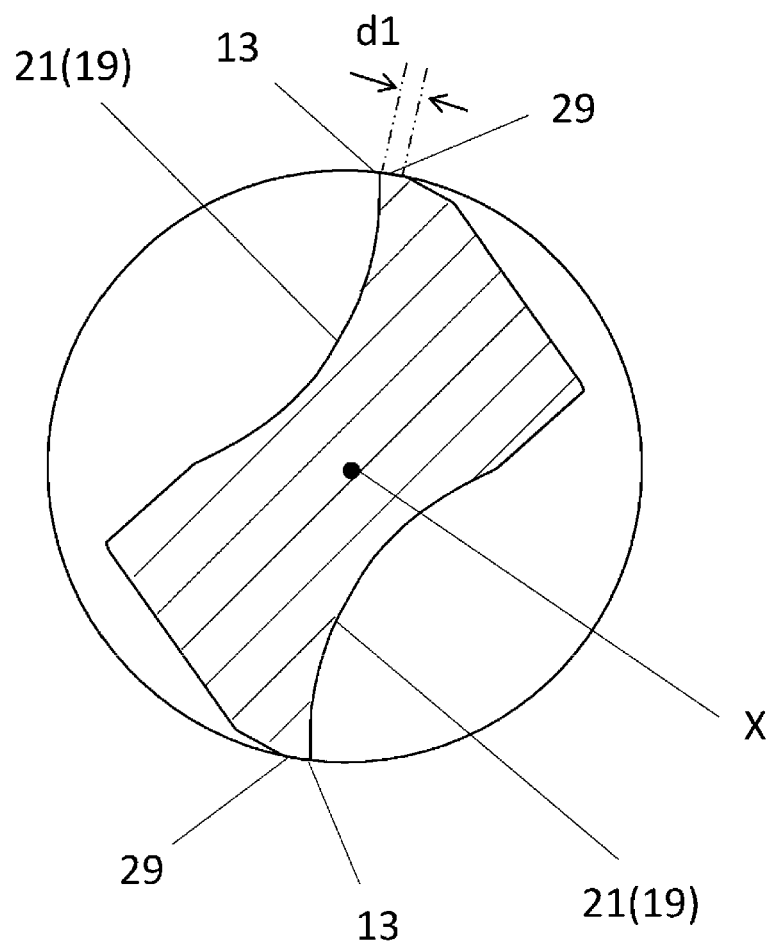
FIG. 10 is a cross-sectional view of an I-I cross-section in FIG. 4.

In the example illustrated in FIG. 5 to FIG. 7, the body 3 may have two ridge portions 13, and thus the flute 19 may include two third flutes 27. The third flute 27 may be used to discharge, to the outside, chips generated by the first cutting edges 15.

The third flute 27 may be assumed to have a third helix angle. Given that the third helix angle is θ3 and that the helix angle of an end on the tip 3a side of the third flute 27, which is included in the third helix angle θ3, is θ3a, the θ3a may be equal to the first helix angle θ1. Given that the helix angle of an end on the rear end 3b side of the third flute 27, which is included in the third helix angle θ3, is θ3b, the θ3b may be equal to the second helix angle θ2.

Additionally, the θ3a may be equal to the first helix angle θ1 and the θ3b may be equal to the second helix angle θ2. The third helix angle θ3 may be evaluated by a method similar to the angle evaluation method for the second helix angle θ2. Specifically, as in an example illustrated in in FIG. 7, the third helix angle θ3 may be evaluated based on the angle between the third flute 27 and the rotation axis X when the body 3 is viewed from the side. In the embodiments, the third helix angle θ3 may be evaluated based on an angle between the ridge portion 13 and the rotation axis X in the third part 25.

In the example illustrated in FIG. 7, in a case where the helix angle θ3a is equal to the first helix angle θ1, a rapid change in the helix angle of a boundary portion between the first flute 21 and the third flute 27 may be likely to be avoided. Thus, chip clogging may be less likely to occur around this boundary portion, leading to improved chip dischargeability.

Additionally, in the example illustrated in FIG. 7, in a case where the helix angle θ3b is equal to the second helix angle θ2, a rapid change in the helix angle of a boundary portion between the second flute 23 and the third flute 27 may be likely to be avoided. Thus, chip clogging may be less likely to occur around this boundary portion, leading to high chip dischargeability.

Furthermore, in the example illustrated in FIG. 7, in a case where the helix angle θ3a is equal to the first helix angle θ1 and the helix angle θ3b is equal to the second helix angle θ2, chip clogging may be less likely to occur around the boundary portion between the first flute 21 and the third flute 27 and around the boundary portion between the second flute 23 and the third flute 27. Thus, chip dischargeability may be further improved.

In the example illustrated in FIG. 7, the third flute 27 may include a portion in which the helix angle θ3 decreases from an end portion on the tip 3a side toward an end portion on the rear end 3b side. When such a configuration is satisfied, the helix angle of the flute 19 from the first flute 21 to the second flute 23 may be likely to be suppress to change rapidly from the tip 3a side toward the rear end 3b side. Thus, chip clogging may be less likely to occur, leading to improved chip dischargeability. Note that the third flute 27 may include a portion in which the helix angle θ3 is constant from the end portion on the tip 3a side toward the end portion on the rear end 3b side.

In the example illustrated in FIG. 7, the helix angle θ3 of the third flute 27 may decrease from the end portion on the tip 3a side toward the end portion on the rear end 3b side. When such a configuration is satisfied, the helix angle of the flute 19 from the first flute 21 to the second flute 23 may be more likely to be prevented from changing rapidly from the tip 3a side toward the rear end 3b side. Thus, chip clogging may be less likely to occur, leading to improved chip dischargeability.

A length L from the end portion on the tip 3a side in the first part 9 to the end portion on the rear end 3b side in the third part 25 may be shorter than an outside diameter D1 of the first part 9. When such a configuration is satisfied, the first part 9 may have a higher strength than a case where L is larger than D1. Thus, a force can be endured that is applied in a direction orthogonal to the rotation axis X when the first part 9 cuts into the workpiece.

The outside diameter D1 of the first part 9 may be set to 2 mm to 25 mm, for example. An outside diameter D2 of the second part 11 may be set to 4 mm to 50 mm, for example. Additionally, an outside diameter of the third part 25 may be set slightly smaller than D1. Specifically, the outside diameter of the third part 25 may be set to approximately 0.01 to 1 mm smaller than D1. The length of the cutting section 5 in a direction along the rotation axis X may be set to, for example, 3D2 to 20D2.

The first part 9 may include a first margin 29 located on a rear side in the rotating direction of the rotation axis X with respect to the first flute 21. As in an example illustrated in FIG. 10, the first margin 29 may be adjacent to the first flute 21 on the rear side in the rotating direction of the rotation axis X.

Figure 11:
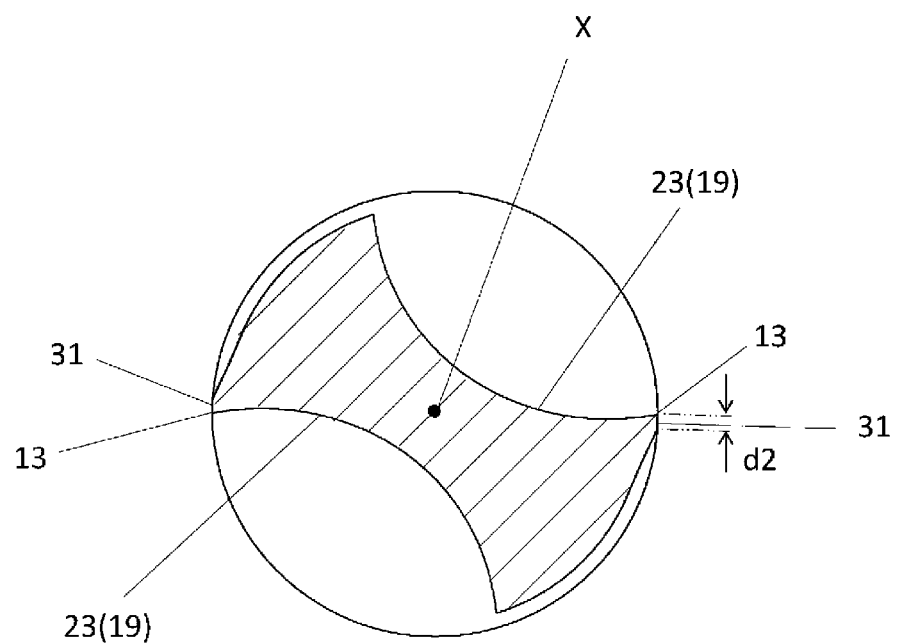
FIG. 11 is a cross-sectional view of the II-II cross-section in FIG. 4.

Additionally, in an example illustrated in FIG. 11, the second part 11 may include a second margin 31 located on the rear side in the rotating direction Y with respect to the second flute 23. As in the example illustrated in FIG. 10, the second margin 31 may be adjacent to the second flute 23 on the rear side in the rotating direction of the rotation axis X.

The first margin 29 in the example illustrated in FIG. 5 may be located along the ridge portion 13. The first margin 29 may be located such that the distance from the rotation axis X to the first margin 29 is approximately constant. A ridge line where the first flute 21 and the first margin 29 meet may form a part of the ridge portion 13. Additionally, the second margin 31 may be located along the ridge portion 13, and the distance from the rotation axis X to the second margin 31 may be approximately constant. Thus, a ridge line where the second flute 23 and the second margin 31 meet may form a part of the ridge portion 13.

In a case where a width d1 of the first margin 29 in the rotating direction Y is larger than a width d2 of the second margin 31 in the rotating direction Y, the first part 9 may deliver high performance as a guide when the workpiece is machined. Due to the guide function described above, the rotary tool 1 may have high straight traveling stability in a direction along the rotation axis X.

Additionally, in a case where the width d2 of the second margin 31 is smaller than the width d1 of the first margin 29 in the rotating direction Y, the second margin 31 may offer reduced cutting resistance, and the second part 11 may offer enhanced defect resistance.

Specifically, the width d2 of the second margin may be set to approximately a few percent of the outside diameter D2 of the second part 11, for example. In this regard, in a case where the width d2 of the second margin 31 is 0.07 mm or smaller, welding of the workpiece caused by the cutting heat may be less likely to occur at the second margin 31. Thus, in a case where boring is performed, for example, increasing the diameter of a machining hole may be difficult. Additionally, in a case where the width d2 of the second margin 31 is 0.03 mm or larger, the second margin 31 may have a sufficient strength, leading to enhanced defect resistance.

A projecting portion 33 in the example illustrated in FIG. 6 may extend substantially along the first cutting edge 15 at a predetermined distance from the first cutting edge 15. The first cutting edge 15 may extend from the tip 3a side toward the rear end 3b side, and thus the projecting portion 33 may also extend from the tip 3a side toward the rear end 3b side. Additionally, the first cutting edge 15 may extend from the rotation axis X side toward the outer peripheral side, and thus the projecting portion 33 may also extend from the rotation axis X side toward the outer peripheral side.

The projecting portion 33 may extend along the first cutting edge 15, and thus chips generated by the first cutting edge 15 advance toward the projecting portion 33. In a case where the first flute 21 includes such a projecting portion 33, the chips may be likely to be separated from a surface of the first flutes 21 when climbing over the projecting portion 33. This enables a reduction in the amount of frictional heat generated due to contact of the chips with the first flutes 21, and an increase in the temperature of the first flute 21 may be likely to be avoided.

As in the example illustrated in FIG. 6, an end portion on the tip 3a side of the projecting portion 33, in other words, the end portion on the rotation axis X side, may extend to a ridge line between a thinning surface 34 and the first flute 21.

In a case where the projecting portion 33 is configured as described above, chips generated at the end portion on the rotation axis X side of the first cutting edge 15 may be likely to advance toward the projecting portion 33. Thus, the chips may be more likely to be separated from the surface of the first flute 21.

Additionally, as illustrated in the example illustrated in FIG. 6, the end portion on the rear end 3b side of the projecting portion 33, in other words, the end portion on the outer peripheral side of the projecting portion 33, may extend to a portion in which the first margin 29 and the first flute 21 meet. In a case where the projecting portion 33 is configured as described above, chips generated at the end portion on the outer peripheral side of the first cutting edge 15 may be likely to advance toward the projecting portion 33. Thus, the chips may be more likely to be separated from the surface of the first flute 21.

Additionally, in a case where the end portion on the outer peripheral side of the projecting portion 33 extends to the portion described above, the end portion may be not located in the third part 25, which has a relatively small outside diameter, but in the first part 9, which is closer to the tip 3a than the third part 25 and has a relatively large outside diameter. Thus, chips generated at the end portion on the outer peripheral side of the first cutting edge 15 may be more likely to be separated from the surface of the first flute 21 at the projecting portion 33.

As in the example illustrated in FIG. 6, a region of the first flute 21 sandwiched between the first cutting edge 15 and the projecting portion 33 may correspond to a part that is likely to be contacted by chips generated by the first cutting edge 15, that is, may correspond to what is-called a rake surface. Thus, the region may be hereinafter referred to as a rake surface region 21a for convenience.

The rake surface region 21a in the example illustrated in FIG. 6 may include a portion in which a length from the first cutting edge 15 to the projecting portion 33 in the direction along the rotation axis X, that is, a width in the direction along the rotation axis X, is constant or increases from the rotation axis X side toward an outer peripheral side of the body 3.

The first cutting edge 15 may extend from the rotation axis X side toward the outer peripheral side, and thus a flow velocity of chips may be likely to be higher in a portion closer to the end portion on the outer peripheral side of the first cutting edge 15. Here, in a case where the rake surface region 21a is configured as described above, at least the width in the direction along the rotation axis X may not decrease from the rotation axis X side toward the outer peripheral side of the body 3. This may avoid a reduced width of the rake surface region 21a, which makes the flow of chips unstable.

In particular, as illustrated in the example illustrated in FIG. 6, the rake surface region 21a may include a portion in which the length from the first cutting edge 15 to the projecting portion 33 in the direction along the rotation axis X, that is, the width in the direction along the rotation axis X, increases from the rotation axis X side toward the outer peripheral side of the body 3. In this case, the rake surface region 21a may be provided with a large width in a portion that is close to the end portion on the outer peripheral side of the first cutting edge 15 and in which the flow velocity of chips is likely to increase. Thus, chips can be caused to flow more stably toward the rear end 3b.

In particular, the end portion on the outer peripheral side of the projecting portion 33 may be located at a boundary between the first part 9 and the third part 25. In this case, the rake surface region 21a may be likely to be provided with a large width. Furthermore, chips generated at the end portion on the outer peripheral side of the first cutting edge 15 may be more likely to be separated from the surface of the first flute 21 at the projecting portion 33.

Examples of the material of the body 3 may include cemented carbide alloy, cermet, or the like. Examples of the composition of the cemented carbide alloy may include WC—Co, WC—TiC—Co, and WC—TiC—TaC—Co. Here, WC, TiC, and TaC may be hard particles, and Co may be a binder phase. Additionally, the cermet may be a sintered composite material obtained by combining a metal with a ceramic component. Specifically, examples of the cermet may include titanium compounds in which one of titanium carbide (TiC) and titanium nitride (TiN) may be the main component.

The surface of the body 3 may be coated with a coating film by using one of a chemical vapor deposition (CVD) method and a physical vapor deposition (PVD) method. Examples of the composition of the coating film may include titanium carbide (TiC), titanium nitride (TiN), titanium carbonitride (TiCN), alumina ($Al_2O_3$), and the like.

Method for Manufacturing Machined Product

Figure 12:
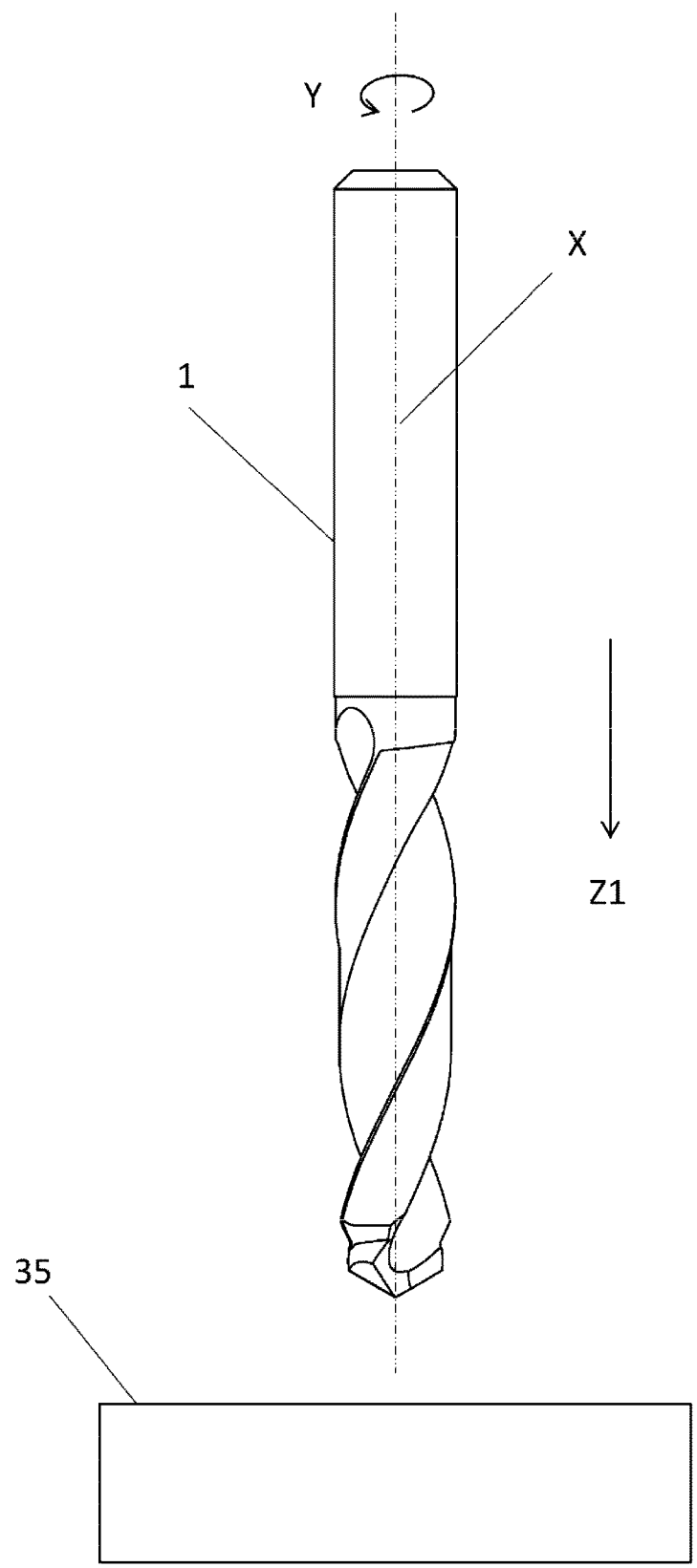
FIG. 12 is a diagram of a step in a method for manufacturing a machined product in a non-limiting aspect of embodiments.
Figure 13:
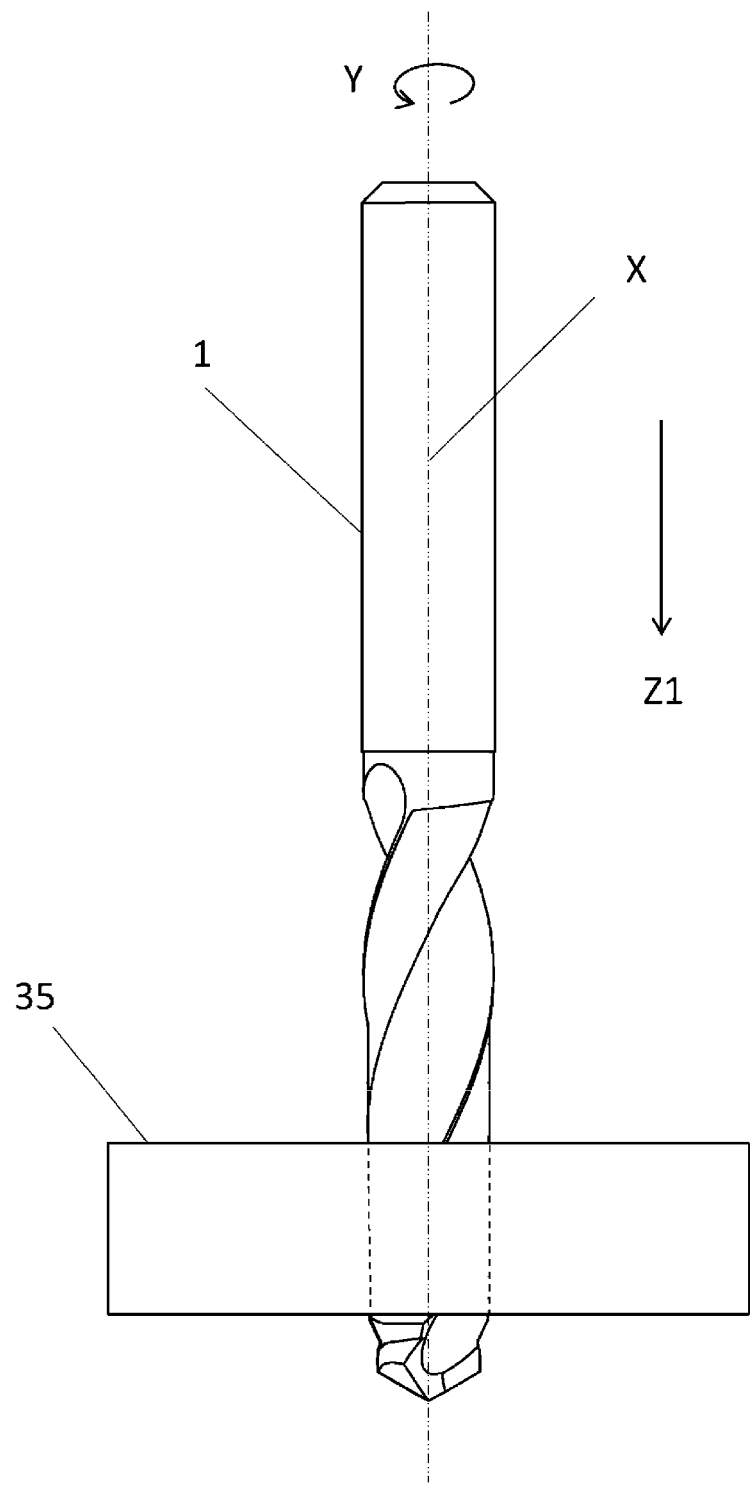
FIG. 13 is a diagram of a step in the method for manufacturing a machined product in a non-limiting aspect of embodiments.
Figure 14:
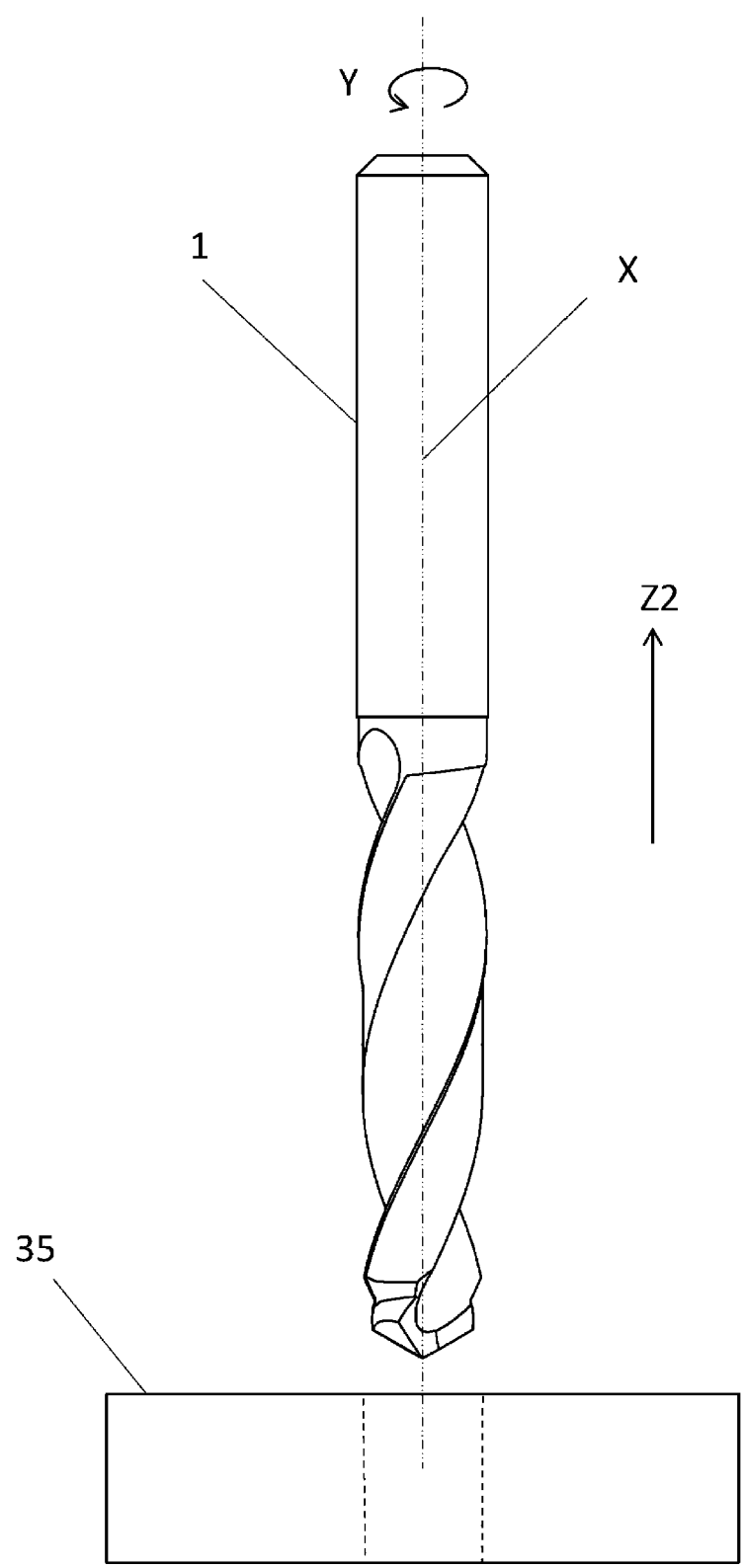
FIG. 14 is a diagram of a step in the method for manufacturing a machined product in a non-limiting aspect of embodiments.

Now, a method for manufacturing a machined product according to a non-limiting aspect of embodiments of the present disclosure will be described in detail, as an example, taking a case where the rotary tool 1 according to the above-mentioned embodiments is used. FIG. 12 to FIG. 14 will be referred to in the following description.

The method for manufacturing a machined product according to the embodiments may include the steps of:

(1) rotating, around the rotation axis X, the rotary tool 1 typified by the above-mentioned embodiments, (2) bringing, into contact with a workpiece 35, at least one of the cutting edges of the rotary tool 1 that is rotating, and (3) separating the rotary tool 1 from the workpiece 35.

More specifically, first, as illustrated in FIG. 12, by rotating the rotary tool 1 around the rotation axis X while moving the rotary tool 1 in a Z1 direction along the rotation axis X, the rotary tool 1 may be brought relatively closer to the workpiece 35.

Then, as illustrated in FIG. 13, at least one of the cutting edges of the rotary tool 1 may be brought into contact with the workpiece 35 to cut the workpiece 35. Note that in the embodiments, the first cutting edge and the second cutting edge may be brought in contact with the workpiece 35. Then, as illustrated in FIG. 14, the rotary tool 1 may be moved in a Z2 direction and relatively away from the workpiece 35.

In the embodiments, with the workpiece 35 fixed and the rotary tool 1 rotating around the rotation axis X, the rotary tool 1 may be brought closer to the workpiece 35. Additionally, in FIG. 13, the workpiece 35 may be cut by bringing the cutting edge of the rotating rotary tool 1 into contact with the workpiece 35. Additionally, in FIG. 14, the rotating rotary tool 1 may be moved away from the workpiece 35.

Note that, in machining in the manufacturing method according to the embodiments, during each of the steps, the rotary tool 1 may be moved to come into contact with or to separate from the workpiece 35. However, as a matter of course, the machining is not limited to such an aspect.

For example, in a step (1), the workpiece 35 may be brought closer to the rotary tool 1. In the same manner, in a step (3), the workpiece 35 may be moved away from the rotary tool 1. In a case where the machining may be to be continued, a step may be repeated in which, with the rotary tool 1 kept rotating, the cutting edge of the rotary tool 1 may be brought into contact with a different part of the workpiece 35.

Here, representative examples of the material of the workpiece 35 may include aluminum, carbon steel, alloy steel, stainless steel, cast iron, non-ferrous metals, and the like.

REFERENCE SIGNS LIST

1 Rotary tool
3 Body
3a First end (tip)
3b Second end (rear end)
5 Cutting section
7 Shank section
9 First part
11 Second part
13 Ridge portion
15 First cutting edge
17 Second cutting edge
18 Connecting edge
19 Flute
21 First flute
21a Rake surface region
23 Second flute
25 Third part
27 Third flute
29 First margin
31 Second margin
33 Projecting portion
34 Thinning surface
35 Workpiece
θ1 First helix angle
θ2 Second helix angle
θ3 Third helix angle
X Rotation axis
Y Rotating direction
Z Cutting direction

The invention claimed is:

1. A rotary tool, comprising:
a body having a rotation axis and extending from a first end to a second end, the body comprising:
a first part including the first end;
a second part located closer to the second end than the first part and having a larger outside diameter than the first part;
a third part having a smaller outside diameter than the first part and located between the first part and the second part;
a cutting edge located at a side of the first end;
a ridge portion located in the first part and the second part, connected to the cutting edge and helically extending from the cutting edge toward the second end; and
a flute located along the cutting edge and the ridge portion, and comprising:
a first flute located at the first part and having a first helix angle;
a second flute located at the second part and having a second helix angle, and
a third flute located at the third part and having a third helix angle, wherein
the second helix angle is smaller than the first helix angle, and the third helix angle at the first end portion is equal to the first helix angle, and the third helix angle at the second end portion is equal to the second helix angle.

2. The rotary tool according to claim 1, wherein the third helix angle decreases from the first end portion toward the second end portion.

3. The rotary tool according to claim 1, wherein a length from an end portion on a side of the first end of the first part to the second end portion is smaller than an outside diameter of the first part.

4. The rotary tool according to claim 1, wherein the first part comprises a first margin located on a rear side in a rotating direction of the rotation axis with respect to the first flute and having a first width in the rotating direction, the second part comprises a second margin located on a rear side in the rotating direction with respect to the second flute and having a second width in the rotating direction, and the first width is larger than the second width.

5. The rotary tool according to claim 1, wherein the first flute comprises a projecting portion extending from a side of the first end to a side of the second end.

6. The rotary tool according to claim 5, wherein the projecting portion extends to the ridge portion.

7. The rotary tool according to claim 5, wherein the first flute further comprises a rake surface region located between the cutting edge and the projecting portion and having a length in a direction along the rotation axis, the rake surface region comprises a portion in which the length is constant or increases from the rotation axis side toward an outer peripheral side of the body.

8. A rotary tool, comprising:
a body having a rotation axis and extending from a first end to a second end, the body comprising:
  a first part including the first end;
  a second part located closer to the second end than the first part and having a larger outside diameter than the first part;
  a cutting edge located at a side of the first end;
  a ridge portion located in the first part and the second part, connected to the cutting edge and helically extending from the cutting edge toward the second end; and
  a flute located along the cutting edge and the ridge portion, and comprising:
    a first flute located at the first part, having a first helix angle and comprising a projecting portion extending from a side of the first end to a side of the second end; and
    a second flute located at the second part and having a second helix angle, wherein
an end portion on the second end side of the projecting portion is located on the ridge portion, and
a portion of the projecting portion that intersects the ridge portion is at a rear-most part of the projecting portion.

* * * * *